United States Patent
Lu

(10) Patent No.: US 6,253,419 B1
(45) Date of Patent: Jul. 3, 2001

(54) PIVOT DEVICE WITH MULTIPLE PIVOTAL BARS FOR A NOTEBOOK COMPUTER

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 0 days.

(21) Appl. No.: 09/482,265

(22) Filed: Jan. 13, 2000

(51) Int. Cl.[7] ............................... E05C 17/64; E05D 7/00
(52) U.S. Cl. ............................ 16/340; 16/365; 16/366; 16/DIG. 43; 16/389
(58) Field of Search ........................ 16/340, 365, 366, 16/334, 337, 389, 367, DIG. 43; 361/681, 680, 683; 248/917–923, 284.1; 403/101, 103, 111, 119, 146

(56) References Cited

U.S. PATENT DOCUMENTS

| | | | |
|---|---|---|---|
| 2,736,027 | * | 2/1956 | Parmelee ................................ 16/334 |
| 4,960,256 | * | 10/1990 | Chihara et al. ......................... 16/361 |
| 5,239,731 | * | 8/1993 | Lu ........................................... 16/340 |
| 5,913,351 | * | 6/1999 | Miura ...................................... 16/340 |
| 6,018,847 | * | 2/2000 | Lu ........................................... 16/337 |
| 6,038,739 | * | 3/2000 | Katoh ..................................... 16/342 |

* cited by examiner

*Primary Examiner*—Chuck Y. Mah
(74) *Attorney, Agent, or Firm*—Varndell & Varndell, PLLC

(57) ABSTRACT

A pivot device with multiple pivotal bars for a notebook computer is disclosed. The pivot device has a main frame and multiple pivotal bars pivotally mounted on the main frame. Each pivotal bar has a positioning means mounted thereon to position each corresponding bar at a desired angle. The pivot device can be connected to several different units of the notebook computer with the multiple pivotal bars respectively. Such that, a digital photo unit can be connected with the notebook computer directly by the pivot device. This will improve the convenience of using and carrying the computer and the digital photo device outdoors.

10 Claims, 7 Drawing Sheets

PIVOT DEVICE WITH MULTIPLE PIVOTAL BARS FOR A NOTEBOOK COMPUTER

BACKGROUND OF THE INVENTION

1. Field of the Invention

The present invention relates to a pivot device, and more particularly to a pivot device with multiple pivotal bars to pivotally connect with several different units of a notebook computer.

2. Description of Related Art

A computer, particularly a notebook computer, is a convenient tool in many fields. There are always many kinds of additional devices such as a printer, a scanner, a digital camera or a digital video connected with the computer to improve the functions of the computer. However, when the user wants to carry the computer to another place for use, the conventional additional devices must be arranged separately. In particular, the digital camera or video is always used in taking pictures or photographing outdoors. Therefore, the conventional additional digital camera and video are inconvenient to carry and use. Thus, a digital camera or video that can be mounted on the notebook computer directly is needed. Consequently, a novel pivot device to pivotally mount the digital camera or video onto the notebook computer is needed.

To overcome the shortcomings, the present invention tends to provide a pivot device for a notebook computer to mitigate or obviate the aforementioned problems.

SUMMARY OF THE INVENTION

The main objective of the invention is to provide a pivot device having a main frame and multiple pivotal bars pivotally mounted on the main frame. Each pivotal bar has a positioning means mounted thereon for positioning each bar at a desired angle, so that the control unit, display unit and additional digital photo unit for a notebook computer can be connected with the pivotal bars of the pivot device respectively to improve the convenience of using and carrying the notebook computer with the additional device.

Other objects, advantages and novel features of the invention will become more apparent from the following detailed description when taken in conjunction with the accompanying drawings.

DETAILED DESCRIPTION OF PREFERRED EMBODIMENT

Figure 1:
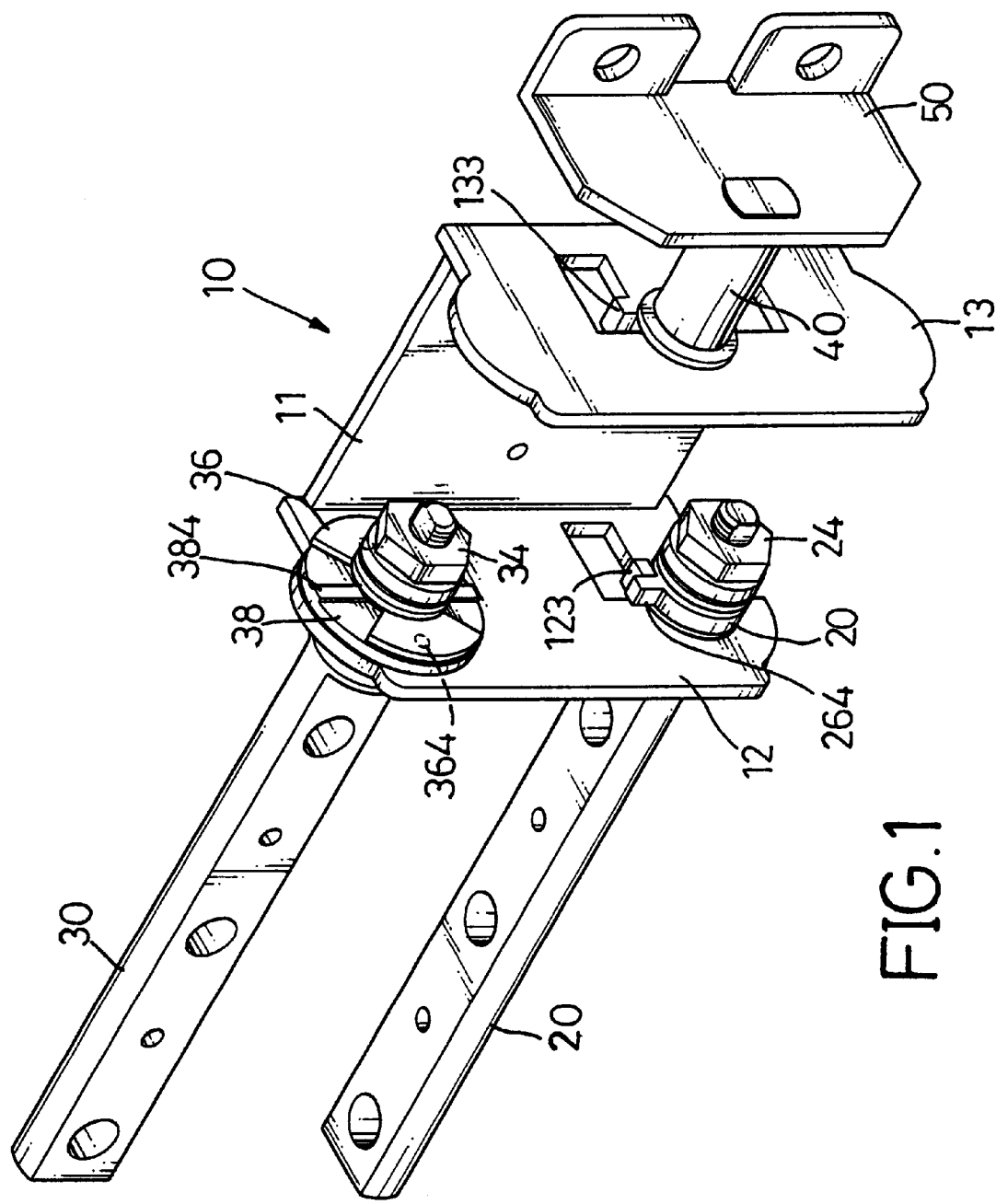
FIG. 1 is a perspective view of a pivot device in accordance with the present invention.
Figure 2:
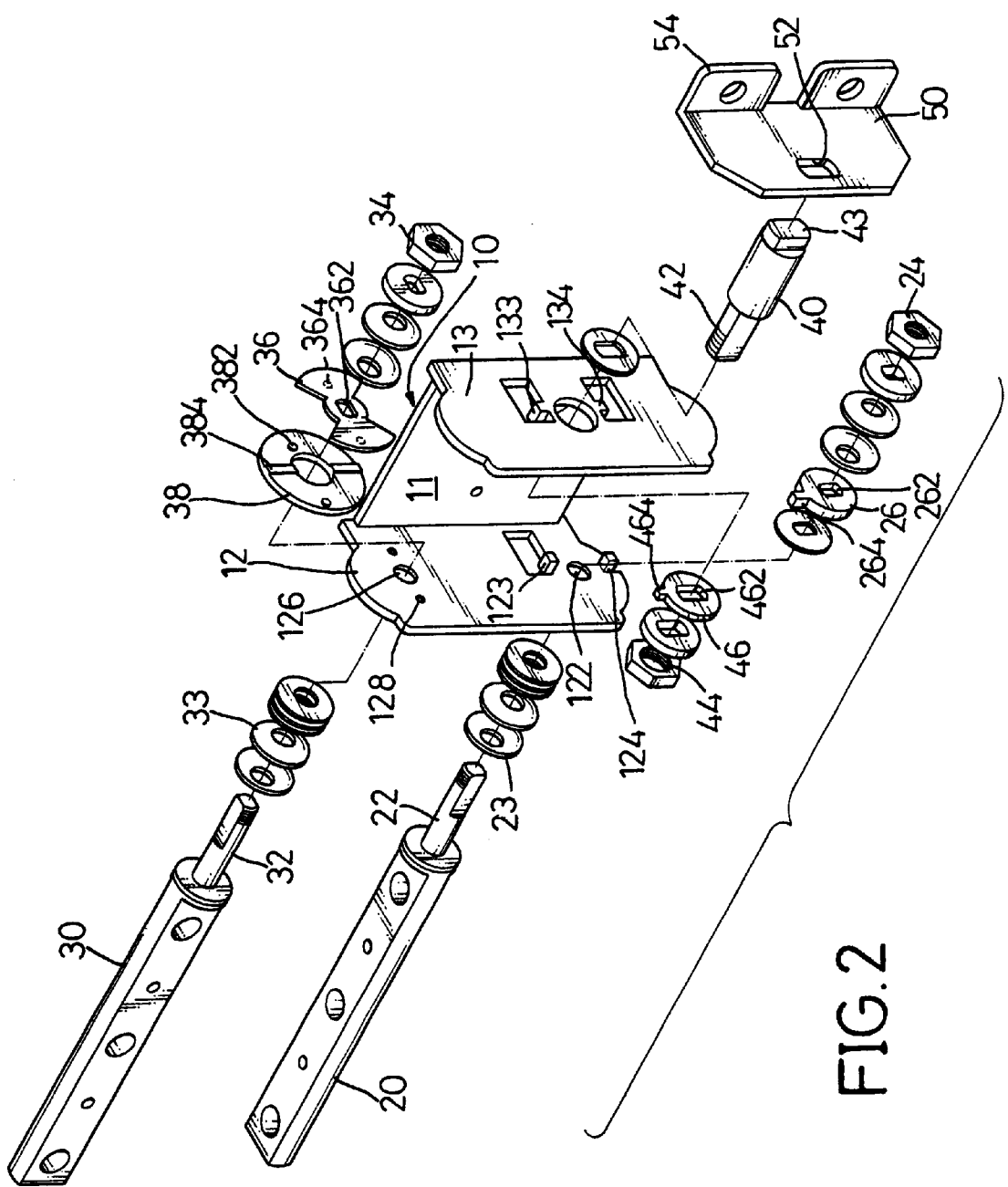
FIG. 2 is an exploded perspective view of the pivot device in FIG. 1.

Referring to FIGS. 1 and 2, a pivot device for a notebook computer in accordance with the present invention comprises a main frame (10) and multiple pivotal bars (20,30,40) pivotally mounted on the main frame (10). The main frame (10) is composed of a back wall (11) and a first and a second sidewalls (12,13) vertically mounted on opposite ends of the back wall (11). Each sidewall (12,13) has at least one through hole (122,126,132). Each pivotal bar (20,30,40) has a key rod (22,32,42) co-axially formed on one end to extend through the corresponding through hole (122,126,132) of the sidewall (12,13). Each key rod (22,32,42) has a threaded portion on the outer periphery on which a nut (24,34,44) is screwed as the rod (22,32,42) extends through the corresponding through hole (122,126,132) so as to pivotally mount each pivotal bar (20,30,40) onto the main frame (10). Each key rod (22,32) of first and second pivotal bars (20,30) has at least one disk spring (23,33) mounted thereon, such that each pivotal bar (20,30) can be positioned at any desired angle by the tension and friction of the disk springs (23,33).

A position disk (26,36,46) has a keyhole (262,362,462) to fit with the corresponding key rod (22,32,42). In a preferred embodiment, a projection (264,464) extends out from the outer periphery of the position disk (26,46) which is mounted on one of the first and third pivotal bars (20,40). Two position lugs (123,124,133,134) are formed on each sidewall (12,13) with the projection (264,464) toward the corresponding position disk (26,46). This provides an angular limit for the rotation of the pivotal bar (20,40) due to the contact of the projection (264,464) and the corresponding position lug (123,124,133,134).

In another preferred embodiment, a stationary disk (38) is mounted on the key rod (33) of the second pivotal bar (30) and has two sides abutting the position disk (36) and the sidewall (12), respectively. Two protrusions (382) are formed on the first side of the stationary disk (38) facing the sidewall (12), and a dimple is correspondingly defined on the second side of the stationary disk (38). One recess (128) is defined on the sidewall (12) to receive each corresponding protrusion (382) on the stationary disk (38). Two ribs (384) are formed on the second side of the stationary disk (38). A protrusion (364) is formed on a side of the position disk (36) facing the stationary disk (38). When the protrusion (364) on the position disk (36) contacts the rib (384) on the stationary disk (38), the second pivotal bar (30) will stop rotating and can be positioned at a desired angle. An angular limit of the rotation of the second pivotal bar (30) is achieved.

Figure 3:
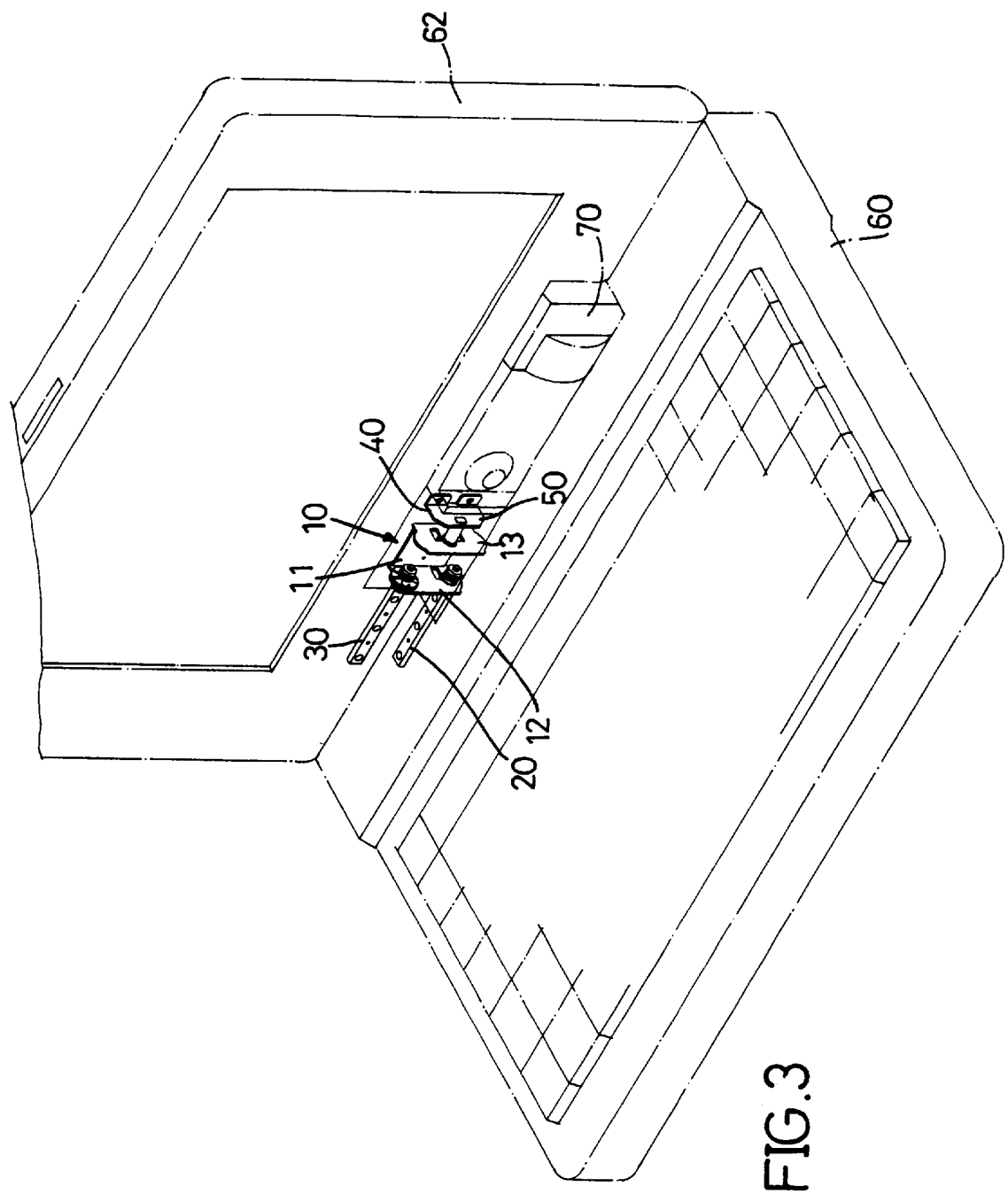
FIG. 3 is a schematic perspective view of a notebook computer with the pivot device in FIG. 1.
Figure 4:
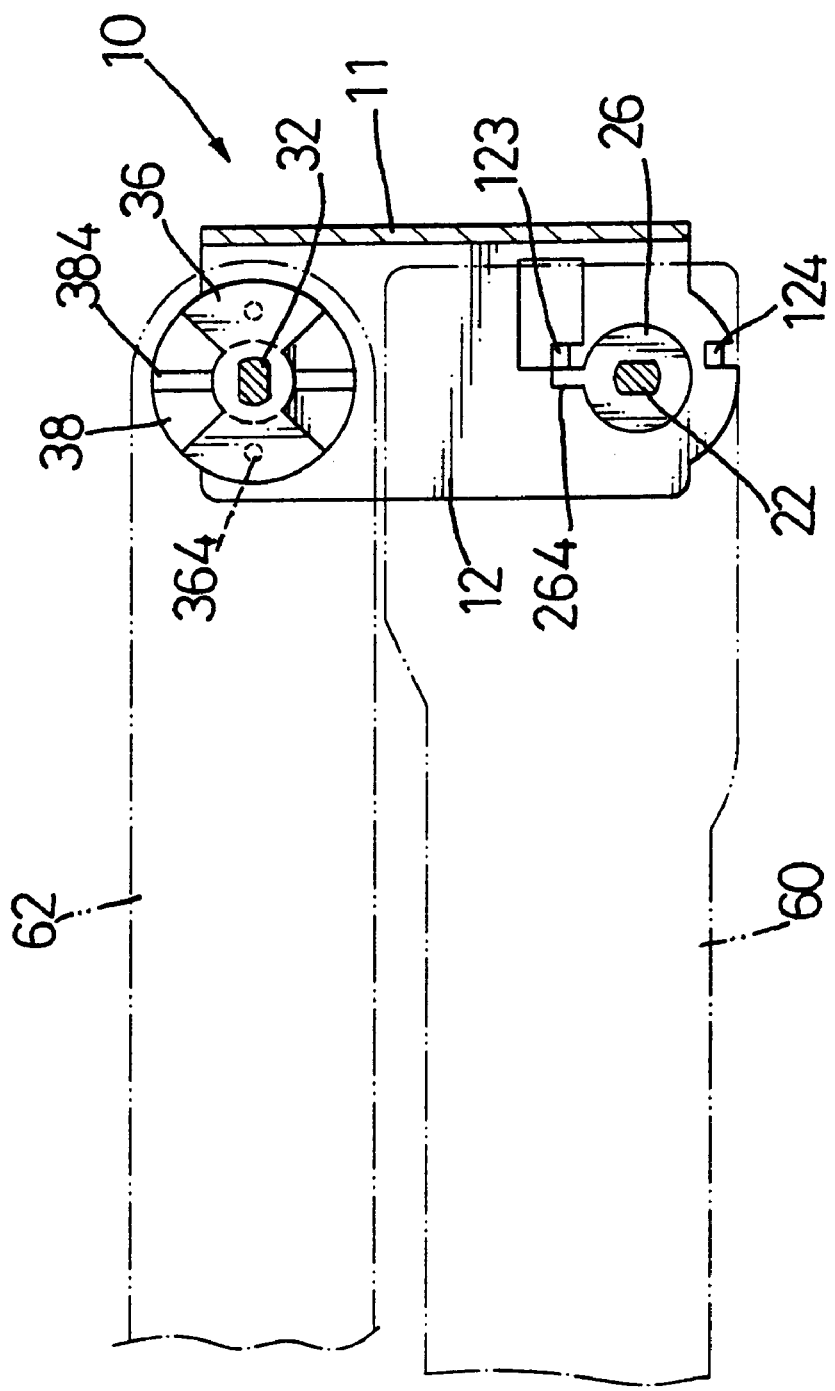
FIG. 4 is a side plan view in partial section of the pivot device in FIG. 1 showing the control unit and display unit closed together.
Figure 5:
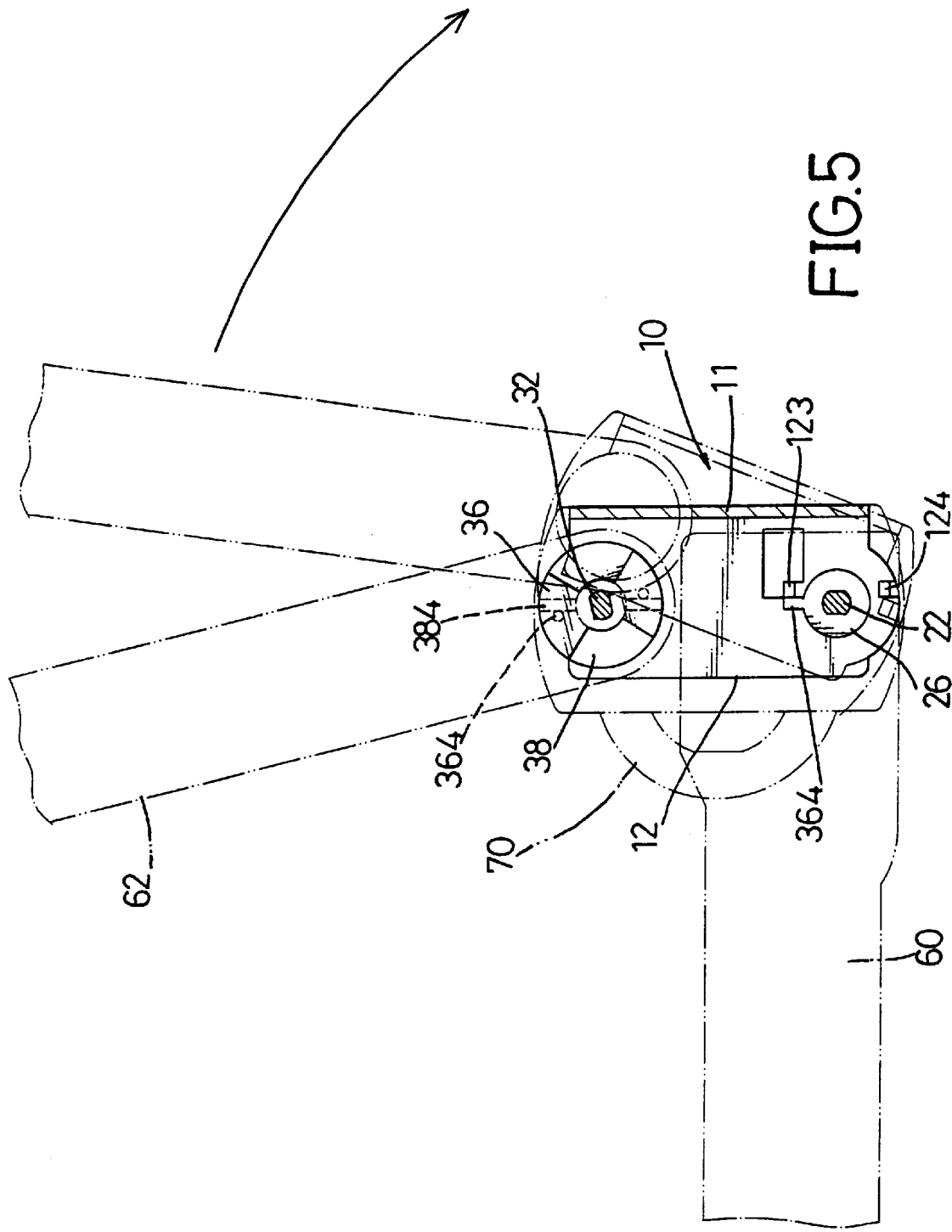
FIG. 5 is an operational side plan view in partial section of the pivot device in FIG. 1 showing the display open relative to the control unit.

In operation, referring to FIGS. 2–4, the first pivotal bar (20) can be connected to the control unit (60) of a notebook computer, and the second pivotal bar (30) can be connected to the display unit (62) of the computer. The third pivotal bar (40) can be connected to a digital photo unit (70) such as a digital camera or video. When the display unit (62) closes to the control unit (60) as the computer is off, the projection (264) of the position disk (26) on the first pivotal bar (20) abuts one of the position lugs (123) on the side wall (12), and each protrusion (364) of the position disk (36) on the second pivotal bar (30) is received in the corresponding depression of the stationary disk (38). Referring to FIGS. 2 and 5, when the user turns on the computer and rotates the display unit (62) relative to the control unit (60), the position disk (36) on the second pivotal bar (30) will synchronously rotate relative to the stationary disk (38). If the user keeps turning the display unit (62) after the protrusion (364) abut the corresponding rib (384) of the stationary disk (38), the main frame (10) will rotate relative to the first pivotal bar (20) and the control unit (60). The angle between the control unit (60) and the display unit (62) will increase so the user can use the notebook computer normally.

Figure 6:
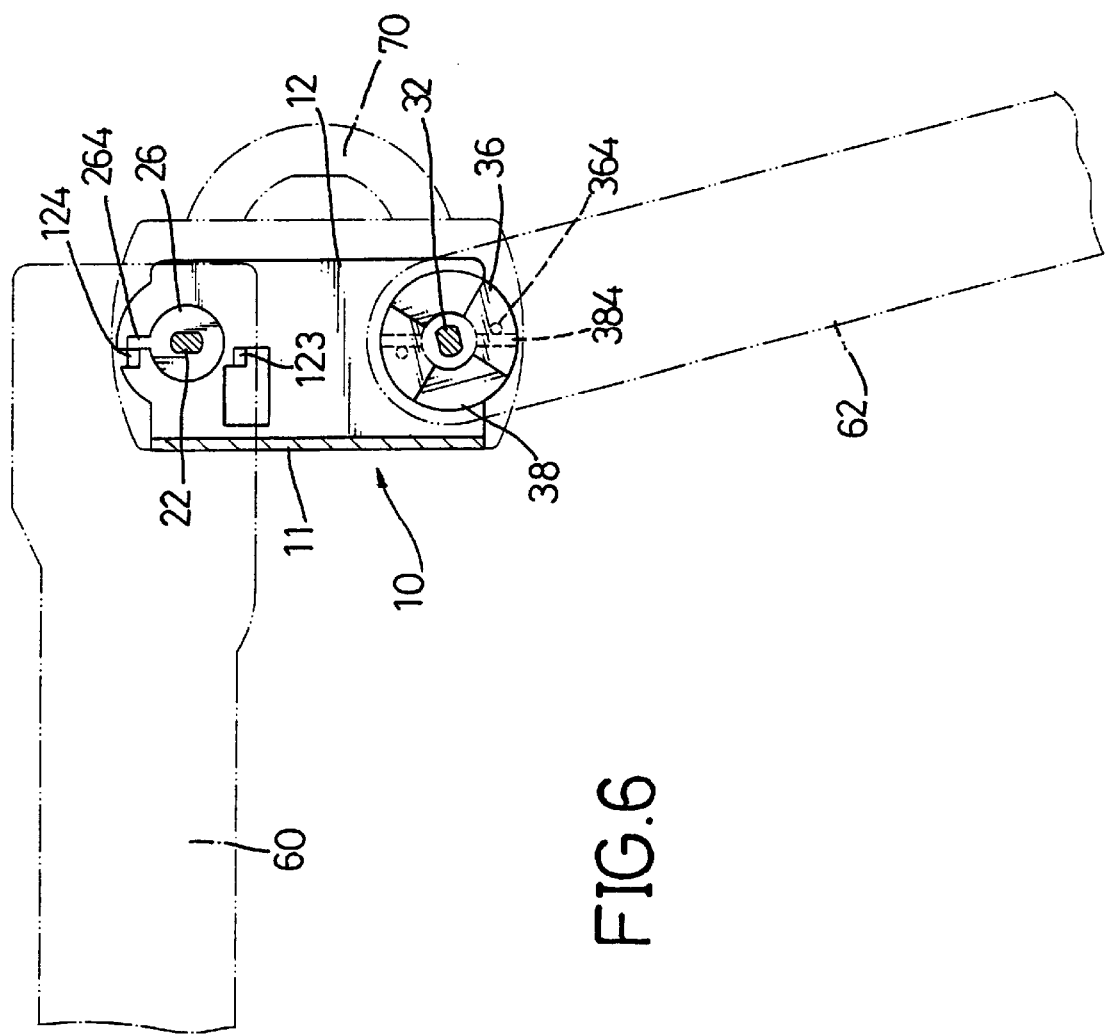
FIG. 6 is an operational side plan view in partial cross section of the pivot device in FIG. 1 showing the display open more than 180° relative to the control unit.
Figure 7:
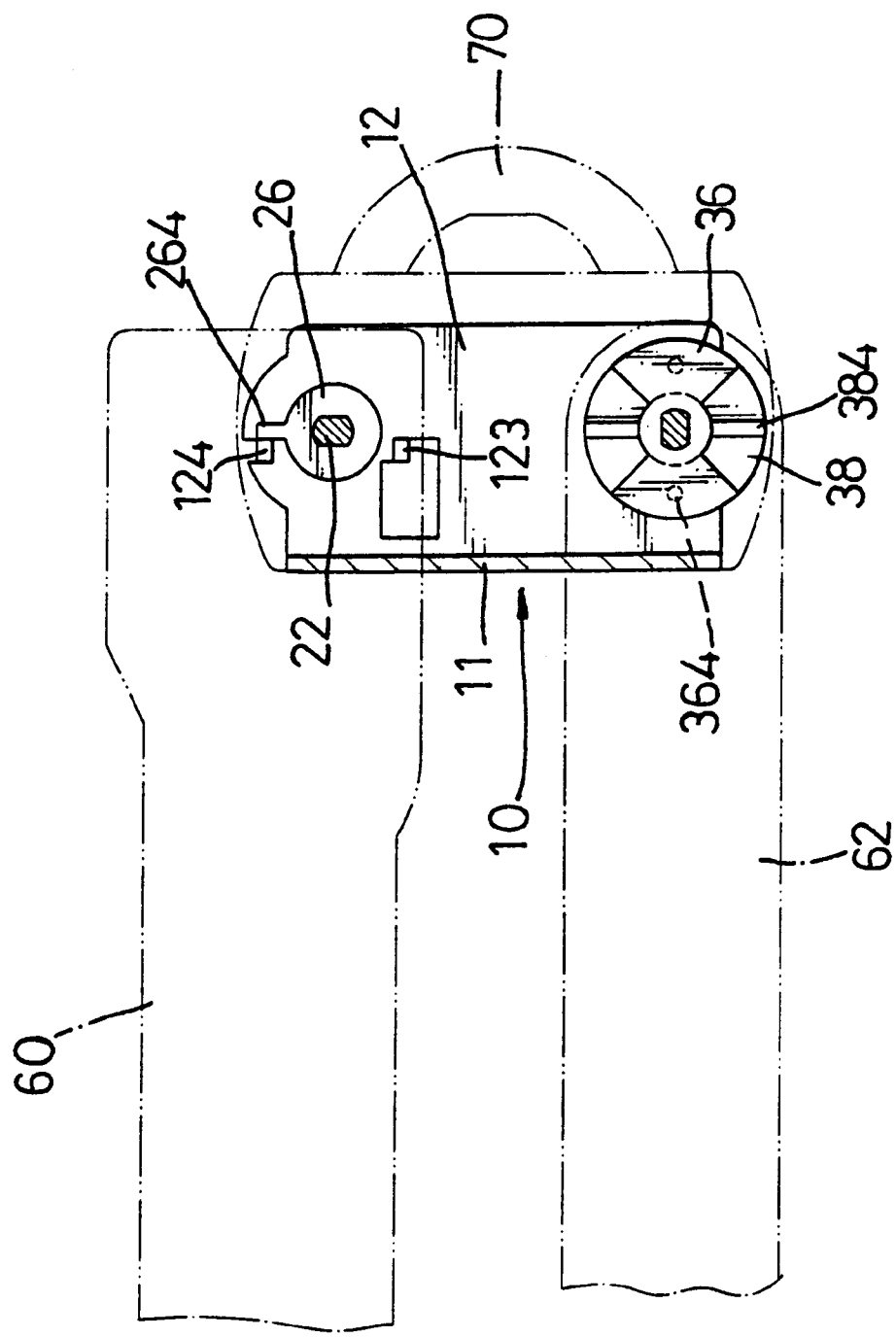
FIG. 7 is an operational side plan view in partial cross section of the pivot device in FIG. 1 showing the display open 360° relative to the control unit for the photo unit to be able to be used conveniently.

Referring to FIG. 6, the main frame (10) will not stop rotating until the other position lug (124) on the sidewall (12) abuts the protrusion (264) on the position disk (26), such that the angle between the control and display units (60, 62) is larger than 180° and about 270°. Thus, the photo unit (70) can be easily used due to the expansion between the control and display units (60, 62). Referring to FIG. 7, by continuing to turn the display unit (62), the projection (364) on the position disk (36) will pass over the rib (384) on the stationary disk (38), such that the display unit (62) can close to the bottom face of the control unit (60) with about a 360° rotation.

Referring to FIGS. 2 and 3, a connecting plate (50) is securely connected with the third pivotal bar (40). A key (43) is formed on the end of said third pivotal bar (40) opposite the key rod (32). A keyhole (52) is defined on the connecting plate (50) to fit with the key (43) on the third pivotal bar (40) to securely connect the connecting plate (50) with the third pivotal bar (40). At least one ear (54) with a through hole defined thereon is vertically mounted on the connecting plate (50) to securely connect to the photo unit (70), such that the third pivotal bar (40) can connect to the photo unit (70) by the connecting plate (50).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pivot device comprising:

a main frame having a back wall;

a sidewall extending vertically from each end of said back wall;

a first pivotal bar pivotally mounted on a first of said sidewalls and having a positioning means mounted thereon;

a second pivotal bar pivotally mounted on said first sidewall and having a positioning means mounted thereon; and a third pivotal bar and pivotally mounted on a second of said sidewalls and having a positioning means mounted thereon.

2. The pivot device as claimed in claim 1, wherein a through hole is defined on each of said sidewalls;

a key rod is co-axial formed on one end of each of said pivotal bars to extend through said corresponding through hole;

each key rod has a threaded portion on the outer periphery; and a nut screws onto said threaded portion of each key rod.

3. The pivot device as claimed in claim 2, wherein at least one disk spring is mounted on each said key rod.

4. The pivot device as claimed in claim 2, wherein a position disk has a keyhole fit on said key rod of said first pivotal bar;

a projection extends outwardly from the outer periphery of said position disk; and two position lugs are formed on said first sidewall and toward said corresponding position disk.

5. The pivot device as claimed in claim 2, wherein a position disk has a keyhole fit on said key rod of said second pivotal bar;

a stationary disk is mounted on said key rod of said second pivotal bar and has two sides abutting said position disk and said first sidewall, respectively;

two protrusions are formed on the first side of said stationary disk facing said sidewall;

a depression is defined on the second side of said stationary disk and corresponds to each protrusion;

two ribs are formed on said second side of said stationary disk; and a protrusion is formed on the side of said position disk facing said stationary disk.

6. The pivot device as claimed in claim 5, wherein one recess is defined on said first sidewall to receive each corresponding protrusion on said stationary disk.

7. The pivot device as claimed in claim 2, wherein a position disk has a keyhole fit on said key rod of said third pivotal bar;

a projection extends out from the outer periphery of said position disk; and two position lugs are formed on said second sidewall and toward said corresponding position disk.

8. The pivot device as claimed in claim 1 further comprising a connecting plate securely connected to said third pivotal bar.

9. The pivot device as claimed in claim 8, wherein a key end is formed on one end of said third pivotal bar; and a keyhole is defined on said connecting plate to fit with said key end of the third pivotal bar.

10. The pivot device as claimed in claim 8, wherein at least one ear with a through hole defined thereon is vertically mounted on said connecting plate.

* * * * *